United States Patent
Kindig et al.

(10) Patent No.: US 6,620,398 B2
(45) Date of Patent: Sep. 16, 2003

(54) METHOD FOR THE PRODUCTION OF AMMONIA

(75) Inventors: J. Kelly Kindig, Rapid City, SD (US); Robert R. Odle, Greenville, SC (US); Thomas E. Weyand, Beaver Falls, PA (US); Boyd R. Davis, Kingston (CA)

(73) Assignee: Alchemix Corporation, Carefree, AZ (US)

( * ) Notice: Subject to any disclaimer, the term of this patent is extended or adjusted under 35 U.S.C. 154(b) by 154 days.

(21) Appl. No.: 09/800,434

(22) Filed: Mar. 6, 2001

(65) Prior Publication Data

US 2002/0127165 A1 Sep. 12, 2002

(51) Int. Cl.$^7$ .................................................. C01C 1/04
(52) U.S. Cl. ........................ 423/359; 423/657; 423/658
(58) Field of Search ................................ 423/352, 359, 423/362, 657, 658

(56) References Cited

U.S. PATENT DOCUMENTS

| | | | |
|---|---|---|---|
| 1,345,905 A | 7/1920 | Abbott | 423/658 |
| 3,031,287 A | 4/1962 | Benson et al. | 48/197 |
| 3,821,362 A | 6/1974 | Spacil | 423/657 |
| 3,880,987 A | * 4/1975 | Nahas | 423/657 |
| 3,979,505 A | 9/1976 | Seitzer | 423/657 |
| 4,072,514 A | 2/1978 | Suzuki | 75/168 |
| 4,088,740 A | 5/1978 | Gaines | 423/359 |
| 4,126,668 A | 11/1978 | Erickson | 423/657 |
| 4,216,199 A | 8/1980 | Erickson | 423/657 |
| 4,298,588 A | 11/1981 | Pinto | 423/359 |
| 4,310,503 A | 1/1982 | Erickson | 423/657 |
| 4,343,624 A | 8/1982 | Belke et al. | 48/61 |
| 4,555,249 A | 11/1985 | Leas | 48/62 |
| 4,600,571 A | 7/1986 | McCarroll et al. | 423/363 |

FOREIGN PATENT DOCUMENTS

| | | | |
|---|---|---|---|
| JP | 4318124 | 11/1992 | C22B/1/02 |
| JP | 1992000003103 | 6/1994 | C01B/3/10 |
| JP | 6-247702 | 9/1994 | C01B/3/02 |

OTHER PUBLICATIONS

Hydrogen From Coal Via Tin Redox: Energy Related Invention Program INV #3, By D. C. Erickson, Feb. 1981.

Straus, Jr., et al.: Proceedings of the 1995 U.S. DOE Hydrogen Program Review, Apr. 18–21, 1995, Coral Gables Florida, vol. 2, pp. 861–876.

* cited by examiner

Primary Examiner—Stanley S. Silverman
Assistant Examiner—Maribel Medina-Sanabria
(74) Attorney, Agent, or Firm—Marsh Fischmann & Breyfogle LLP

(57) ABSTRACT

A method for the production of ammonia. The method includes the reduction of steam using a metal species such as iron or tin to form pure hydrogen gas and the reaction of hydrogen gas with nitrogen gas to form ammonia. The nitrogen gas can be formed by extracting the oxygen from air through the oxidation of a metal, yielding nitrogen gas.

19 Claims, 7 Drawing Sheets

METHOD FOR THE PRODUCTION OF AMMONIA

BACKGROUND OF THE INVENTION

1. Field of the Invention

The present invention is directed to a method for the production of high purity ammonia. The method advantageously produces large volumes of hydrogen gas at a low cost as compared to prior art methods thus enabling the production of ammonia at a low cost. The ammonia can be used in a number of diverse applications such as for the manufacture of urea for fertilizers.

2. Description of Related Art

Ammonia ($NH_3$) is useful in a number of applications. For example, ammonia is useful in fertilizers, either as ammonia or in the form of compounds such as ammonium nitrate. Ammonia is also useful in a number of chemical processes such as the manufacture of nitric acid, urethane and other compounds. Ammonia is typically manufactured from synthesis gas obtained by steam reformation or partial combustion of natural gas or from the action of steam on hot coke. After removal of the carbon oxides, the gas composition is adjusted to a molar ratio of 3 parts $H_2$ to 1 part $N_2$ and is passed over a catalyst at a pressure of about 300 atmospheres and temperature of about 500° C. The most significant cost associated with the manufacture of ammonia is the high cost of producing a pure hydrogen gas stream to be reacted with the nitrogen.

It is known that hydrogen gas ($H_2$) can be produced from many different feedstocks such as natural gas, biomass or water using a number of different techniques such as reformation, gasification or electrolysis. The most common methods are steam methane reformation, coal gasification, non-catalytic partial oxidation, biomass gasification and pyrolysis, and electrolysis.

Steam methane reformation is believed to be the most economical and commercially viable process that is presently available. The feedstock is typically natural gas and the feedstock cost represents about 52% to 68% of the total cost. The process forms a gas stream that includes $H_2$ and CO and the CO must be separated from the gas stream to form pure $H_2$.

Hydrogen production from coal gasification is another established commercial technology, but is only economically competitive where natural gas prohibitively expensive. In the coal gasification process, steam and oxygen are utilized in the coal gasifier to produce a hydrogen-rich gas. High purity hydrogen can then be extracted from the synthesis gas by a water-gas shift reaction. Other gases such as fuel gases and acid gases must also be separated from the hydrogen. Hydrogen can be similarly formed by the gasification of hydrocarbons such as residual oil.

The manufacture of hydrogen by steam oxidation is also known. For example, U.S. Pat. No. 4,343,624 by Belke et al. discloses a 3-stage hydrogen production method and apparatus utilizing a steam oxidation process. In the first stage, a low BTU gas containing $H_2$ and CO is formed from a feedstock such as coal. The low BTU gas is then reacted in a second stage with ferric oxide ($Fe_3O_4$) to form iron (Fe), carbon dioxide ($CO_2$) and steam ($H_2O$) in accordance with the reaction:

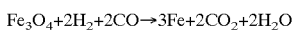

The steam and iron are then reacted in a third stage to form hydrogen gas by the reaction:

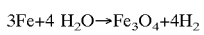

It is disclosed that the iron oxide can be returned to the second stage for use in the iron oxide reduction reaction, such as by continuously returning the iron oxide to the second stage reactor via a feed conduit. At least one of the stages takes place in a rotating fluidized bed reactor.

U.S. Pat. No. 4,555,249 by Leas discloses a gas fractionating unit that contains a reagent powder, such as an iron alloy, having a significant weight difference between the reduced form and the oxidized form. The unit includes an oxidation zone and a reduction zone for containing the reagent powder wherein hydrogen gas is extracted from the oxidation zone. As the reagent powder is converted from the oxidized to the reduced form, the weight of the powder increases and the change in weight is utilized to transfer the reduced powder to the oxidation zone while moving the oxidized powder to the reduction zone.

The article "$H_2$ from Biosyngas via Iron Reduction and Oxidation", by Straus et al., discloses a method for hydrogen production from biosyngas. The biosyngas, which included $H_2$, CO, $H_2O$, and $CO_2$ with traces of $N_2$ and $CH_4$, was used to reduce magnetite ($Fe_3O_4$) to iron (Fe). The iron was then cooled and fed to a hydrogen gas generator where the iron was contacted with steam to form hydrogen by steam-oxidation. The iron oxide was then cooled and returned to the reduction reactor for reaction with the biosyngas.

Other metal/metal oxide systems have been used in addition to iron/iron oxide. For example, U.S. Pat. No. 3,821,362 by Spacil illustrates the use of $Sn/SnO_2$ to form hydrogen. Molten tin is atomized and contacted with steam to form $SnO_2$ and hydrogen gas. The $SnO_2$ is then contacted with a producer gas composed of $H_2$, $N_2$ and CO, which is formed by contacting powdered coal with air. The $SnO_2$ is reduced to liquid tin, which is then transferred back to the first reactor. A similar method is illustrated in U.S. Pat. No. 3,979,505.

There remains a need for an economical process for the production of ammonia from nitrogen and hydrogen. It is believed that the primary hindrance to the economical production of ammonia and related products is the high cost of the hydrogen reactant.

SUMMARY OF THE INVENTION

The present invention is directed to a method for the economical production of ammonia having a high purity.

DESCRIPTION OF THE INVENTION

The present invention is directed to the production of ammonia using hydrogen gas and nitrogen gas as reactants. One of the important aspects of the method according to the present invention is the in-situ manufacture of large quantities of $H_2$ at a relatively low cost. It is believed that one of the primary hindrances to the methods disclosed in the prior art for the production of ammonia is the need for high volumes of hydrogen gas and the high cost associated with the hydrogen gas. According to the present invention, high volumes of hydrogen gas can be economically generated in-situ.

Preferably, a hydrogen gas stream is produced by the reduction of steam ($H_2O$) with a metal (Me), thereby forming hydrogen gas ($H_2$) and a metal oxide (MeO). In a particularly preferred embodiment, a metal oxide is simultaneously reduced in a separate reactor to form a metal that can subsequently be used for the steam reduction.

Figure 1:
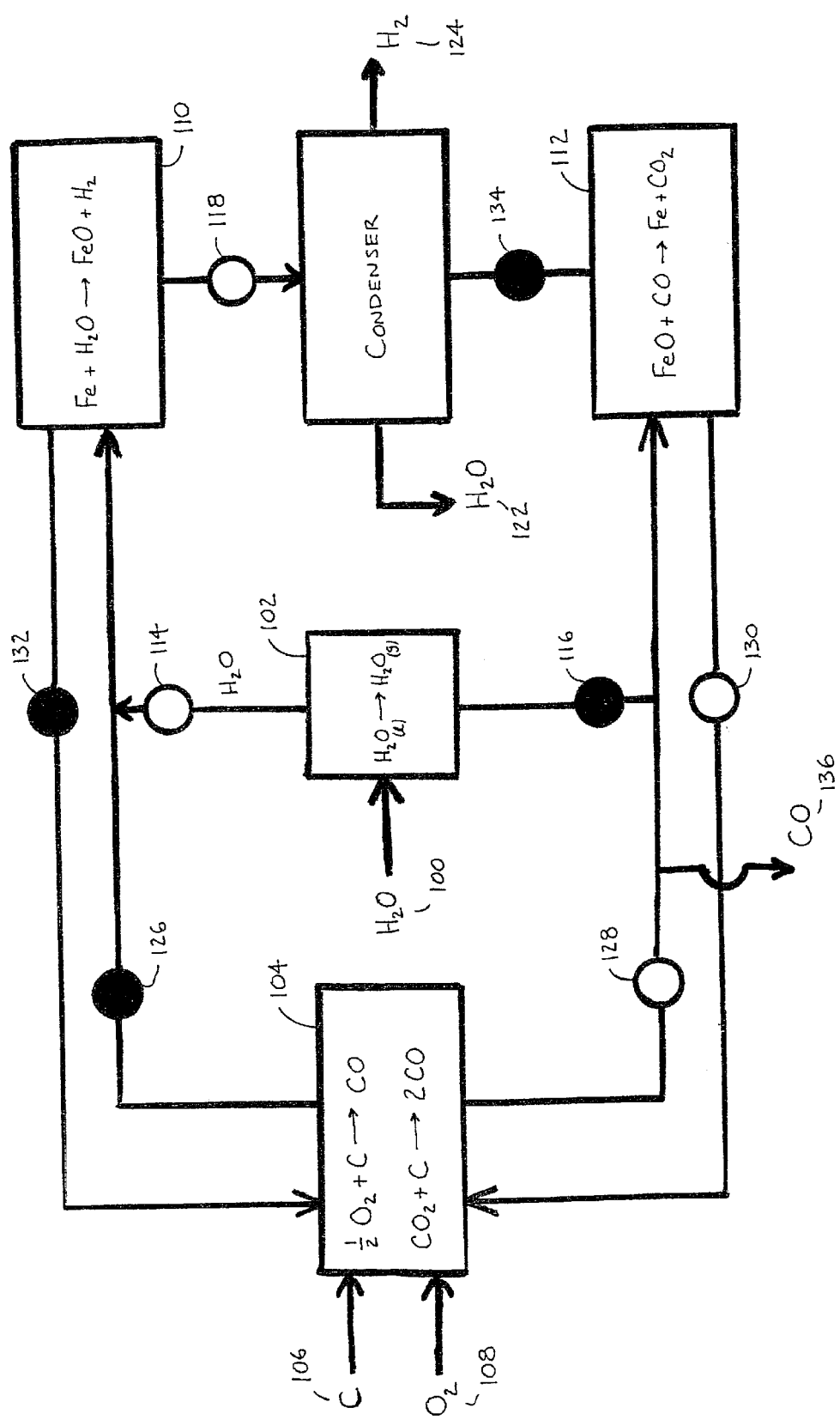
FIG. 1 illustrates a flowsheet of a method for hydrogen production using iron and iron oxide in accordance with the present invention.
Figure 2:
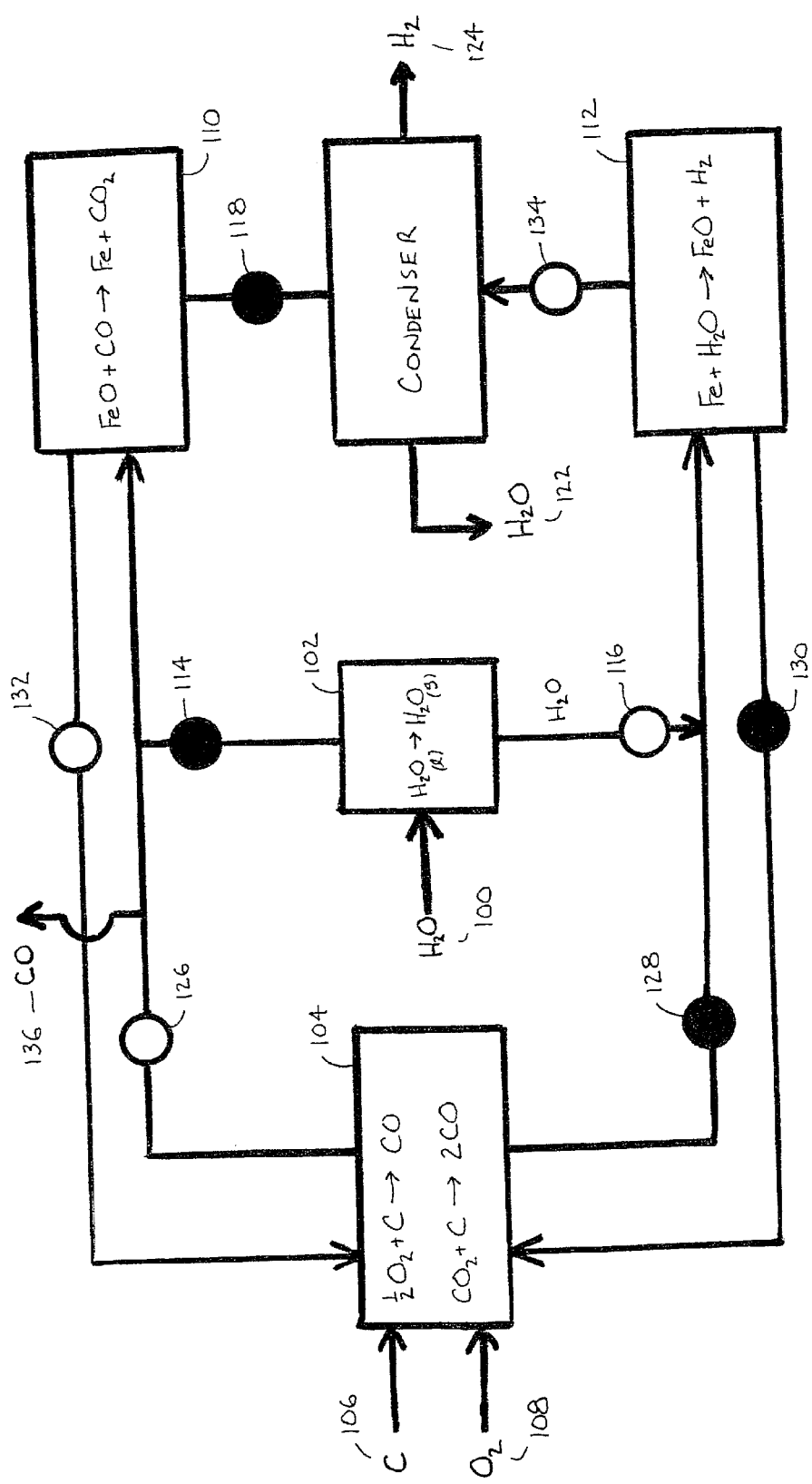
FIG. 2 illustrates a flowsheet of a method for hydrogen production using iron and iron oxide in accordance with the present invention.

Referring now to the Figures, the present invention will be described in detail. FIGS. 1 and 2 illustrate one embodiment of the method of the present invention using iron and iron oxide to generate hydrogen gas for subsequent reaction to form ammonia. FIGS. 1 and 2 illustrate the same apparatus with alternating flow of gaseous reactants and products to continuously form both iron and iron oxide reaction products for the process. Although this embodiment of the present invention is described with respect to oxidation/reduction reactions involving iron metal, it may be desirable to utilize metal alloys such as Fe/Ni or Fe/Cr.

As is illustrated in FIG. 1, steam (gaseous $H_2O$) is generated from water 100 in a reactor 102, such as a conventional boiler. The steam exits the steam reactor 102 and is conveyed directly to a first reactor 110 through valve 114. The temperature of the steam can be adjusted to control the temperature in the first reactor 110.

A reducing gas, preferably a reducing gas that includes carbon monoxide (CO), is generated in a reduction gas reactor 104. In the embodiment illustrated in FIG. 1, supplying carbon 106 and oxygen 108 to the reactor 104 initially generates CO from carbon and oxygen ($O_2$). As the reaction progresses, the CO is produced from $CO_2$ by the Boudouard reaction:

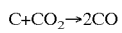

$$C + CO_2 \rightarrow 2CO$$

The source of the carbon 106 can be, for example, coal, oil, biomass or a similar carbonaceous material. The reducing gas exiting reactor 104 is preferably at least about 90 weight percent CO and more preferably is at least about 95 weight percent CO.

The steam and the reducing gas are then supplied to first and second reactors 110 and 112. The first and second reactors 110 and 112 can be adapted to hold molten metal or molten metal oxide through which reactant gases are passed, or the reactors can be fluidized bed reactors that are adapted to contact the gases with solid metal and metal oxide particulates in a fluidized state. For the use of iron and iron oxide, the first reactor 110 and second reactor 112 are preferably fluidized beds.

The steam reactor 102 has associated valves 114 and 116 that can be switched to provide the steam to either the first reactor 110 or the second reactor 112. In the embodiment illustrated in FIG. 1, the valve 114 is open to provide steam to the first reactor 110. The first reactor is initially provided with iron, preferably in particulate form. In the first reactor 110 the steam reacts with the iron to form iron oxide, preferably FeO, and hydrogen gas, in accordance with the reaction:

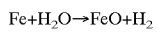

$$Fe + H_2O \rightarrow FeO + H_2$$

To maximize hydrogen production, it is preferable to feed a stoichiometric excess of $H_2O$ to the first reactor 110. Hydrogen gas and the water vapor are removed through a valve 118 to a condenser 120 where water 122 is removed from the gas stream and pure hydrogen gas 124 is recovered.

Simultaneously, the reduction gas reactor 104 produces CO reducing gas. The valves 126 and 128 are controlled to provide the reducing gas composition to the appropriate reactor. In the embodiment illustrated in FIG. 1, the valve 128 is opened to supply reducing gas to the second reactor 112. Excess CO 136 is preferably removed to remove oxygen from the system corresponding to the amount of hydrogen being removed from the system. This excess CO 136 can be used as process heat, such as to heat the boiler 102, advantageously conserving heat value in the process and maximizing the use of unreacted CO.

In the second reactor 112, iron oxide is initially provided and the reducing gas composition is reacted with the iron oxide to form iron and carbon dioxide, in accordance with the reaction:

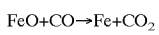

$$FeO + CO \rightarrow Fe + CO_2$$

The iron oxide is preferably in fluidized particulate form to enable the rapid and economical formation of the iron. Advantageously, the carbon dioxide can be recycled back to the reactor 104 through valve 130 for the production of additional reducing gas. In one embodiment, sufficient $CO_2$ is recycled back to the reactor 104 such that the amount of fresh oxygen 108 supplied to reducing gas reactor 104 is only enough to maintain the desired reaction temperature. Preferably, the reaction temperature in the reduction gas reactor 104 is from about 800° C. to about 1300° C.

FIG. 2 illustrates the identical apparatus as is illustrated in FIG. 1. However, in FIG. 2, the valves 114, 116, 118, 126, 128, 130, 132 and 134 are switched so that the first reactor 110 is the metal reduction reactor and the second reactor 112 is the steam reduction reactor. Hydrogen gas is therefore extracted from the second reactor 112 through valve 134.

In accordance with the foregoing, it is apparent that the first and second reactors 110 and 112, at any given point in time during the process, will include some mixture of iron and iron oxide. In one embodiment, the composition of the reactor feed in the first and second reactors is monitored and the flow of gaseous reactants is switched accordingly. Although temperature adjustments to the reactors can be made on a real-time basis, it is an advantage of the present invention that the reactors are maintained at a substantially constant reaction temperature regardless of whether the reactor is being utilized for the reduction of steam or the reduction of iron oxide. Therefore, no heating, cooling and reheating of the non-gaseous reactants is necessary. In a preferred embodiment, the reaction temperature of the first and second reactors is maintained at not greater than about 1000° C., such as from about 700° C. to about 900° C.

It is also an advantage of the present invention that the non-gaseous reactants (e.g., the iron and the iron oxide) are not physically moved from one location to another, such as from one reactor or reactor zone to another. On a commercially useful scale, the amount of iron and/or iron oxide in each reactor can be several hundred tons. Eliminating the need to move such a large mass of material substantially reduces the cost associated with producing the hydrogen gas. It will be appreciated that it may be desirable to supplement the iron and/or iron oxide with fresh feed due to any inherent system losses, although such supplementation should be minimal.

Other metal/metal oxide systems can be used for the production of hydrogen gas and subsequent reaction to form ammonia according to the present invention. In one particularly preferred embodiment, tin (Sn) and tin oxide (SnO$_2$) are used to form hydrogen gas.

Figure 3:
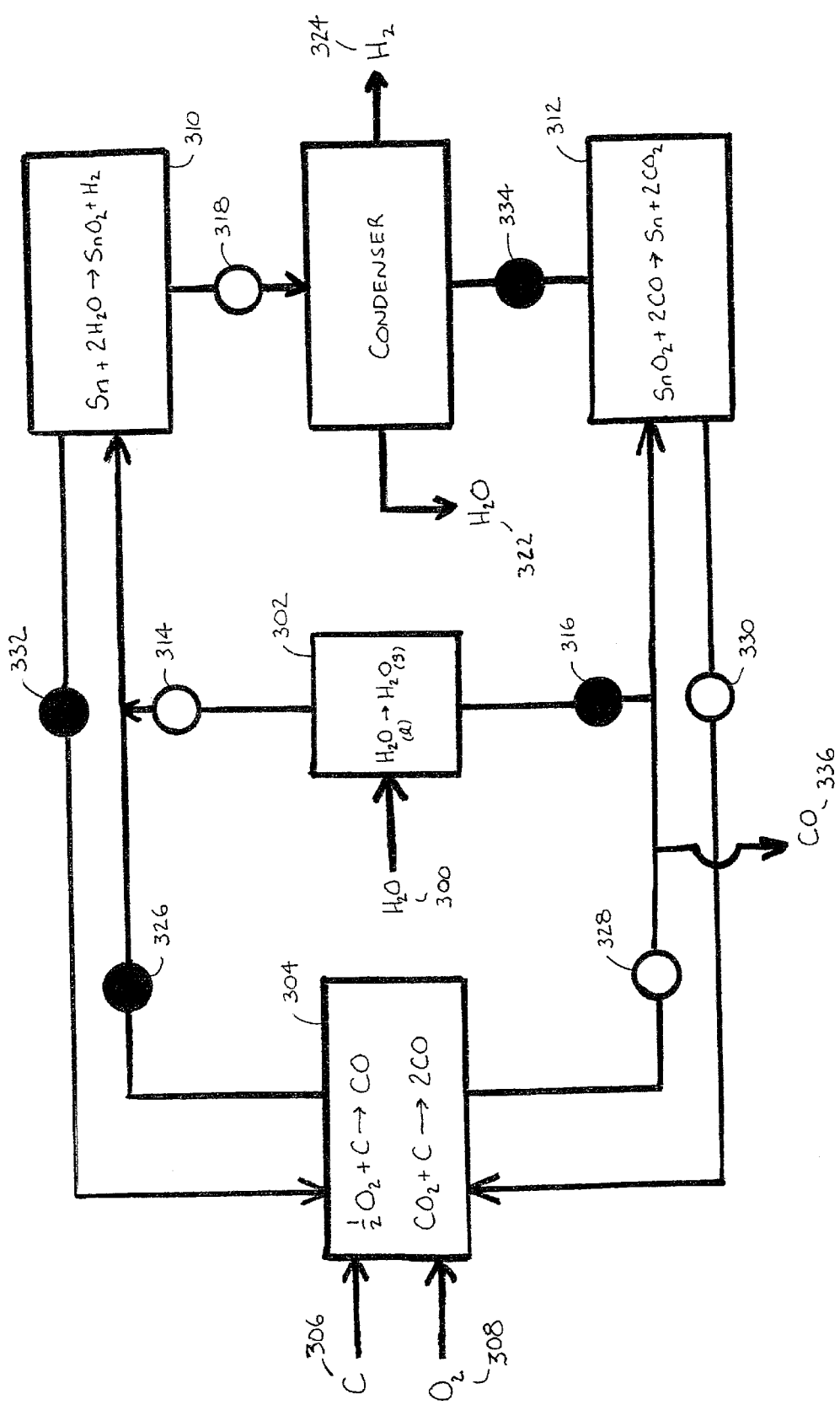
FIG. 3 illustrates a flowsheet of a method for hydrogen production using tin and tin oxide in accordance with the present invention.
Figure 4:
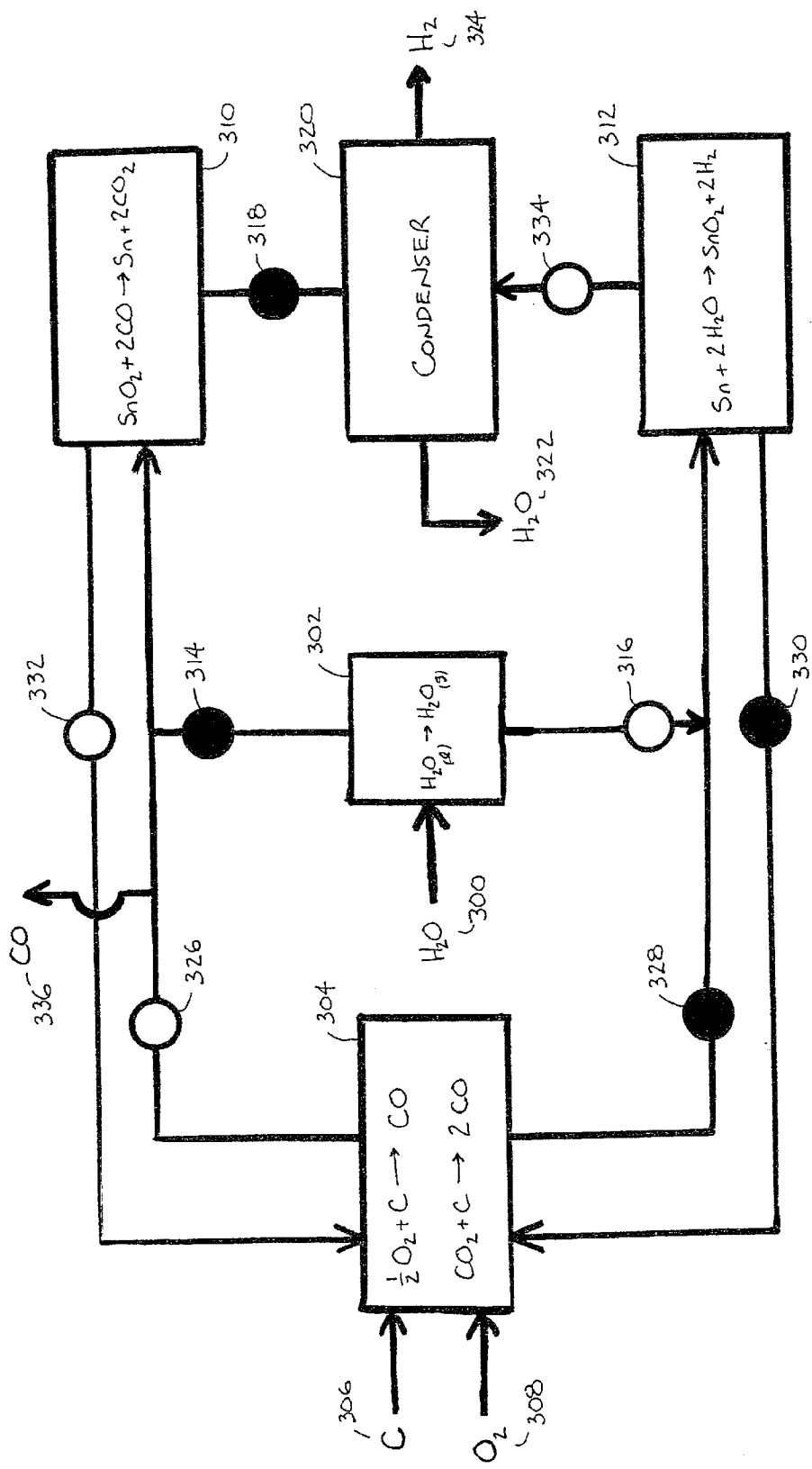
FIG. 4 illustrates a flowsheet of a method for hydrogen production using tin and tin oxide in accordance with the present invention.

FIGS. 3 and 4 illustrate an embodiment of the method of the present invention wherein hydrogen is formed using tin (Sn) and tin oxide (SnO$_2$). Similar to FIGS. 1 and 2, FIGS. 3 and 4 illustrate the same apparatus with alternating flow of gaseous reactants and products to continuously form both metal and metal oxide reaction products.

As is illustrated in FIG. 3, steam is generated from water 300 in a steam reactor 302, such as a conventional boiler. The steam exits the steam reactor and is conveyed to the first reactor 310 through valve 314. The temperature of the steam can be adjusted to partially control the reaction temperature in the first reactor 310.

A reducing gas, preferably a reducing gas that includes carbon monoxide (CO), is generated in a reactor 304. In the embodiment illustrated in FIG. 3, supplying carbon 306 and oxygen 308 to the reactor initially generates CO from carbon and oxygen (O$_2$). As the reaction progresses, the CO is produced from CO$_2$ by the Boudouard reaction. The source of the carbon 306 can be, for example, coal or a similar carbonaceous material. The reducing gas exiting the reactor 304 is preferably at least about 90 weight percent CO and more preferably is at least about 95 weight percent CO.

The steam and the reducing gas are then supplied to first and second reactors 310 and 312. The steam is preferably reacted with molten tin metal by passing the gaseous steam through a pool of the molten metal. The molten tin metal will oxidize, forming SnO$_2$ particulates dispersed in the molten Sn metal.

Therefore, the first reactor 310 and second reactor 312 are preferably large reactors adapted to heat and contain molten tin and a mixture (slurry) of molten tin with tin oxide. The steam reactor 302 has associated valves 314 and 316 that can be switched to provide the steam to either the first reactor 310 or the second reactor 312. In the embodiment illustrated in FIG. 3, the valve 314 is open to provide steam to the first reactor 310. The first reactor 310 is initially provided with a pool of molten tin having a temperature of at least about 232° C. (the melting point of tin) and preferably from about 600° C. to about 800° C. In the first reactor 310 the steam reacts with the molten tin to form SnO$_2$ and hydrogen gas, in accordance with the reaction:

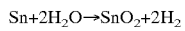

$$Sn+2H_2O \rightarrow SnO_2+2H_2$$

To maximize hydrogen production, it is preferable to feed a stoichiometric excess of H$_2$O to the first reactor 310. Hydrogen gas and the excess water vapor are removed through a valve 318 to a condenser 320 where water 322 is removed from the gas stream and pure hydrogen gas 324 is recovered.

Simultaneously, the reduction gas reactor 304 produces CO reducing gas by the Boudouard reaction. The valves 326 and 328 are controlled to provide the reducing gas composition to the appropriate reactor. In the embodiment illustrated in FIG. 3, the valve 328 is opened to supply reducing gas to the second reactor 312. Excess CO 336 is preferably removed to remove oxygen from the system corresponding to the amount of hydrogen being removed from the system. This excess CO 336 can be used as process heat, such as to heat the boiler 302. In the second reactor 312, tin oxide is initially provided and the reducing gas composition is reacted with the tin oxide to form molten tin metal and carbon dioxide, in accordance with the reaction:

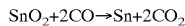

$$SnO_2+2CO \rightarrow Sn+2CO_2$$

The tin oxide is preferably in particulate form to enable the rapid and economical reduction of the tin oxide to tin metal.

The tin oxide can initially be provided as a slurry of the oxide in molten tin metal. Advantageously, the carbon dioxide can be recycled back to the reactor 304 through valve 330 for the production of additional reducing gas. In one embodiment, sufficient CO$_2$ is recycled back to the reactor 304 such that the amount of fresh oxygen 308 supplied to Boudouard reactor 304 is only enough to maintain the desired reaction temperature, which is preferably from about 800° C. to about 1300° C. This also maximizes the use of unreacted CO.

FIG. 4 illustrates the identical apparatus as is illustrated in FIG. 3. However, in FIG. 4, the valves 314, 316, 318, 326, 328, 330, 332 and 334 are switched so that the first reactor 310 is the metal reduction reactor and the second reactor 312 is the steam reduction reactor. Hydrogen gas is therefore extracted from the second reactor 312 through valve 334.

It is apparent that the reactors 310 and 312, at any given point in time during the process, will include some mixture of tin and tin oxide. In one embodiment, the composition of the reactor feed in the first and second reactors is monitored and the flow of gaseous reactants is switched accordingly. Although temperature adjustments to the reactors can be made on a real-time basis, it is an advantage of the present invention that the reactors are maintained at a substantially constant reaction temperature regardless of whether the reactor is being utilized for the reduction or the oxidation of the tin/tin oxide. Therefore, no heating, cooling and reheating of the non-gaseous reactants is necessary. In a preferred embodiment for the production of hydrogen from Sn/SnO$_2$, the reaction temperature of the first and second reactors is maintained at a temperature of at least about 232° C. and not greater than about 1120° C. (the melting point of SnO$_2$), such as from about 400° C. to about 800° C. Lower reaction temperatures are preferred to minimize large SnO$_2$ particles whereas higher temperatures increase reaction kinetics.

As with the iron/iron oxide system described hereinabove, it is also an advantage of the present invention that the non-gaseous reactants (i.e., the molten tin and the tin oxide) are not physically moved from one location to another, such as from one reactor or reactor zone to another. On a commercially useful scale, the amount of molten tin and/or tin oxide in each reactor can be several hundred tons. By eliminating the need to move such a large mass of material the cost associated with producing the hydrogen gas is substantially reduced. It will be appreciated that it may be desirable to supplement the tin and/or tin oxide with fresh feed due to any inherent system losses, although such supplementation should be minimal.

The hydrogen gas stream that is produced according to the foregoing method has a high purity and preferably includes greater than about 99 weight percent hydrogen and more preferably greater than about 99.9 weight percent hydrogen after removal of residual water in the condenser. It is an advantage of this embodiment of the invention that the hydrogen gas does not require separation from another gas species such as carbon monoxide (CO).

To produce ammonia in accordance with the present invention, nitrogen (N$_2$) must also be supplied with the hydrogen. Nitrogen gas is readily available and can be supplied from an external source. According to a preferred embodiment, the nitrogen gas is produced by stripping nitrogen from air using a methodology that is similar to the method that extracts hydrogen from water.

Figure 5:
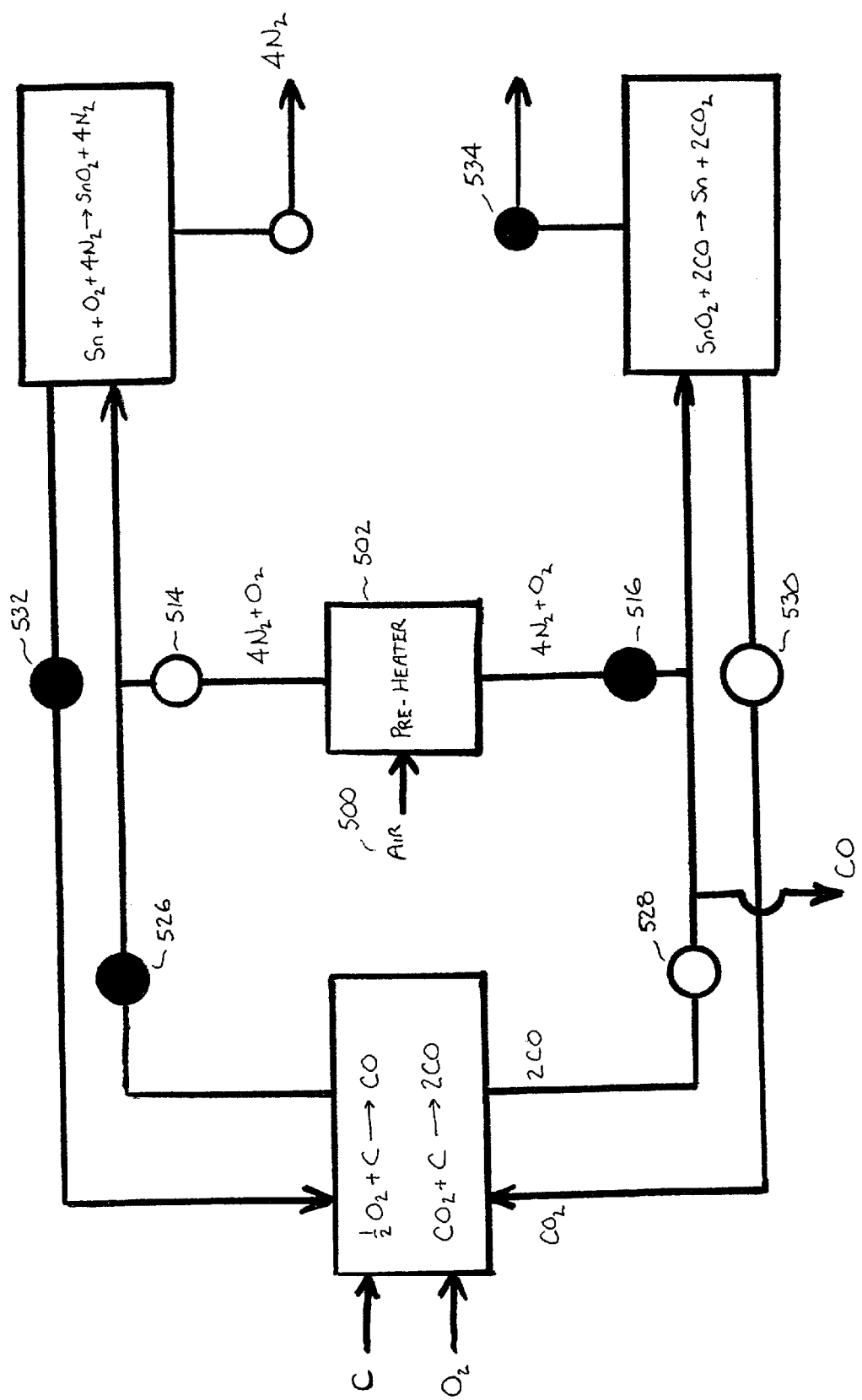
FIG. 5 illustrates a flowsheet of a method for nitrogen production using tin and tin oxide in accordance with the present invention.

A preferred method is illustrated in FIG. 5. Referring to FIG. 5, air 500 is supplied to pre-heater unit 502 where the air can be heated to an elevated temperature. The air is composed primarily of nitrogen and oxygen, and more specifically includes about 78 volume percent nitrogen and about 21 volume percent oxygen. The heated air is conveyed to a reactor 510 through a valve 514. The temperature of the air exiting the pre-heater 502 can be adjusted to control the temperature in the reactor 510.

A reducing gas, preferably a reducing gas that includes carbon monoxide, is generated in the reactor 504. In the embodiment illustrated in FIG. 5, supplying carbon 506 and oxygen 508 to the reactor initially generates CO from carbon and oxygen. As the reaction progresses, CO is produced from $CO_2$ by the Boudouard reaction. The generation of CO is essentially identical to the generation of CO that is illustrated in FIGS. 1–4. The source of carbon 506 can be, for example, coal or a similar carbonaceous material. Thus, the reducing gas is preferably at least about 90 mole percent CO and more preferably is at least about 95 mole percent CO.

Figure 6:
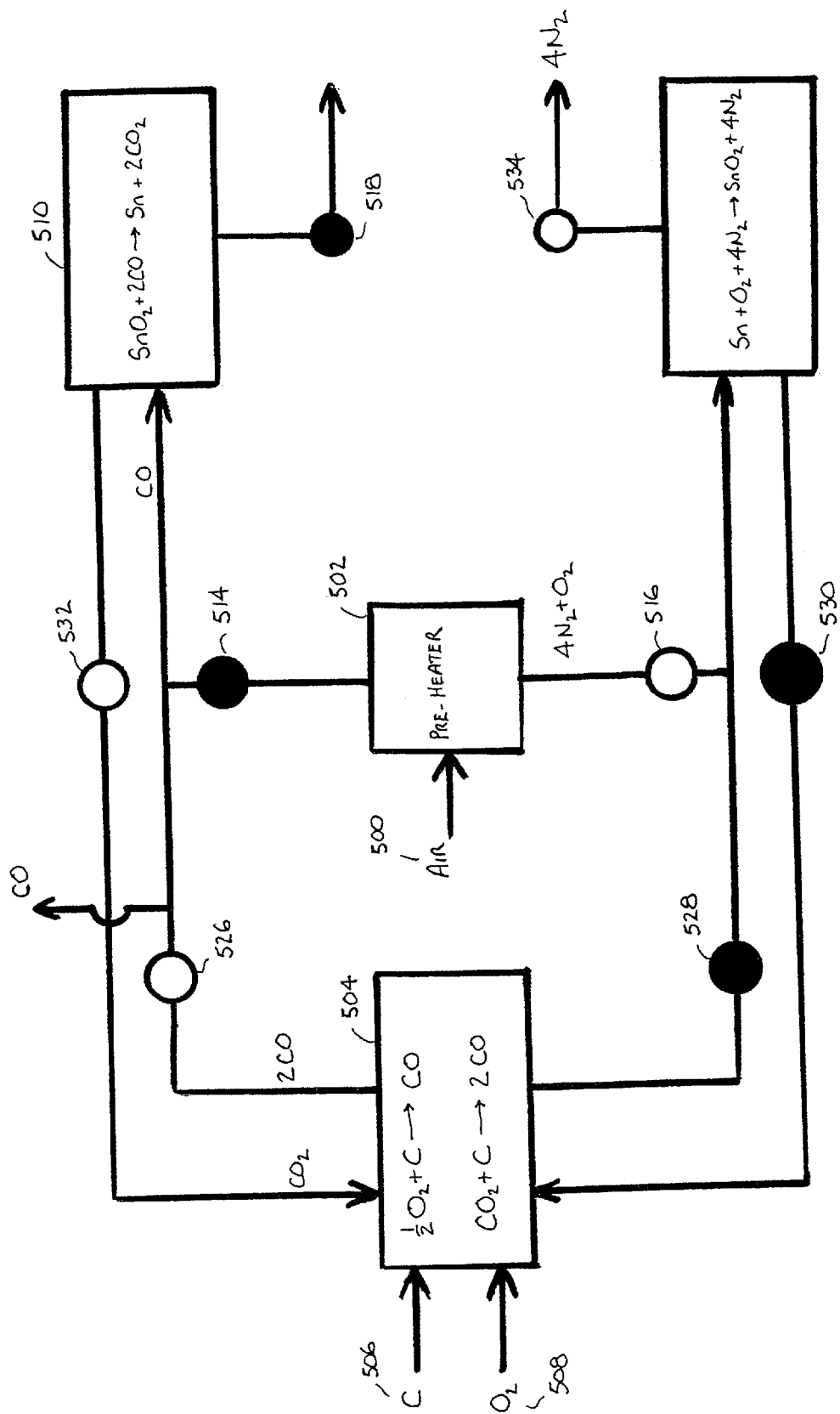
FIG. 6 illustrates a flowsheet of a method for nitrogen production using tin and tin oxide in accordance with the present invention.

The air and the reducing gas are then supplied to first and second reactors 510 and 512. Although FIGS. 5 and 6 illustrates the use of tin/tin oxide to form the nitrogen gas, it will be appreciated that other metal/metal oxide systems such as iron/iron oxide can also be utilized. The air is preferably reacted with molten tin metal by passing the air through a pool of the molten metal. The molten tin metal oxidized, forming $SnO_2$ particulates dispersed in the molten tin metal. Therefore, the first reactor 510 and the second reactor 512 are preferably large reactors adapted to heat and contain molten tin and a mixture (slurry) of molten tin with tin oxide. Other metal/metal oxide systems, such as iron/iron oxide may require the use of different reactors such as fluidized bed reactors.

The preheater 502 has associated valves 514 and 516 that can be switched to provide the air to either the first reactor 510 or the second reactor 512. In the embodiment illustrated in FIG. 5, the valve 514 is open to provide air to the first reactor 510. The first reactor 510 is initially provided with a pool of molten tin having a temperature of at least about 232° C. (the melting point of tin) and preferably from about 300° C. to about 800° C. Into the first reactor 510 the air, which is primarily composed of $4N_2$ and $O_2$, is stripped of the oxygen by the tin resulting in a nitrogen gas stream:

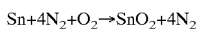

$$Sn + 4N_2 + O_2 \rightarrow SnO_2 + 4N_2$$

The amount of air delivered to the reactor 510 is carefully controlled to ensure that all of the oxygen in the air is reacted with the tin resulting in a nitrogen gas stream of high purity. The off-gas from the reaction can be monitored to ensure that the off-gas is substantially pure nitrogen, and the reaction conditions can be adjusted as necessary. Nitrogen gas is removed from the reactor 510 through a valve 518.

Simultaneously, the reduction gas reactor 504 produces a reducing gas by the Boudouard reaction. The valves 526 and 528 are controlled to provide the reducing gas composition to the appropriate reactor. In the embodiment illustrated in FIG. 5, the valve 528 is open to supply reducing gas to the second reactor 512. Excess CO is preferably removed to remove oxygen from the system corresponding to the amount of nitrogen being removed from the system. This excess CO can be used as process heat, such as to heat the preheater 502. In the second reactor 512, tin oxide is initially provided and the reducing gas composition is reacted with the tin oxide to form molten tin metal and $CO_2$. The tin oxide is preferably in particular form to enable the rapid and economical reduction of the tin oxide to tin metal. The tin oxide can initially be provided as a slurry of the oxide in molten tin metal. Advantageously, the $CO_2$ can be recycled back to the reactor 504 through valve 530 for the production of additional reducing gas. In one embodiment, sufficient carbon dioxide is recycled back to the reactor 504 such that the amount of fresh oxygen 508 supplied to the Boudouard reactor 504 is only enough to maintain the desired reaction temperature.

FIG. 6 illustrates the identical apparatus as is illustrated in FIG. 5. However, in FIG. 6, the valves 514, 516, 518, 526, 528, 530, 532, and 534 are switched so that the first reactor 510 is the reduction reactor and second reactor 512 is the oxidation reactor. Nitrogen gas is therefore extracted from the second reactor 512 through valve 534.

In accordance with the present invention, the nitrogen and hydrogen are combined in a $H_2:N_2$ molar ratio of about 3:1 in order to maximize the production of ammonia ($NH_3$). In a typical ammonia production method, a gas including hydrogen and nitrogen is compressed to about 200 atmospheres of pressure and passed over an iron catalyst at a temperature of from about 380° C. to about 450° C.

Figure 7:
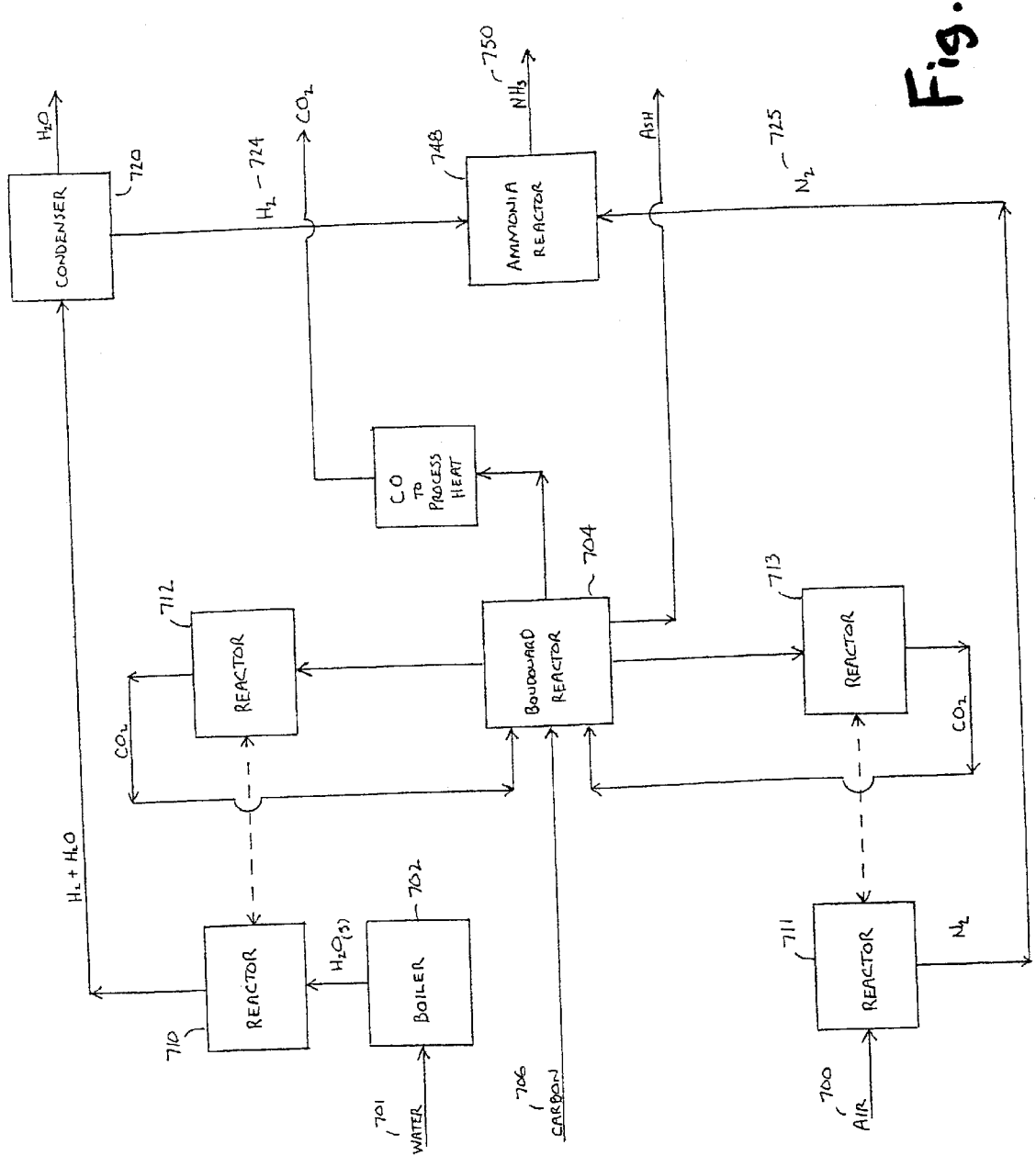
FIG. 7 illustrates a flowsheet of a method for ammonia production in accordance with the present invention.

A method for producing ammonia incorporating the foregoing hydrogen and nitrogen gas production methods is illustrated in FIG. 7. For the production of hydrogen, water 701 is provided to a boiler 702 and steam is provided to one of reactors 710 or 712. As is illustrated in FIG. 7, in reactor 710 steam is reduced to $H_2$ and Me is oxidized to MeO, whereas in reactor 712, MeO is reduced to Me and CO is oxidized to $CO_2$. The hydrogen gas is then passed to a condenser 720 to remove water and is then supplied to an ammonia reactor 748.

Simultaneously, air 700 supplied to an oxidation reactor 711 to strip oxygen from the air in provide a nitrogen gas stream 725. It will be appreciated with reference to FIGS. 5 and 6 that the reactors 711 and 713 functionally alternate as the reduction and oxidation reactors. In the embodiment illustrated in FIG. 7, the reactor 711 is the oxidation reactor whereas the reactor 713 is the metal oxide reduction reactor. Advantageously, a single reactor 704 can be used to provide reduction gas to both the hydrogen production and nitrogen production unit operations. Further, it is an advantage of the present invention that the reactors 710, 711, 712, and 713 can be the same type of reactor.

Thus, hydrogen gas 724 and nitrogen gas 725 are provided to the ammonia reactor 748. The ammonia reactor preferably operates an elevated pressure, such as up to about 200 atmospheres. In addition, the ammonia reactor 748 operates at an elevated temperature and can include a catalyst. The production of ammonia from hydrogen and nitrogen is illustrated in: U.S. Pat. No. 4,600,571 by McCarroll et al.; U.S. Pat. No. 4,298,588 by Pinto; and U.S. Pat. No. 4,088,740 by Gaines. Each of the foregoing U.S. Patents is incorporated herein by reference in their entirety.

The resulting ammonia can be used in a number of applications. For example, the ammonia can be converted to urea for use in fertilizers. The ammonia can also be used to reduce $NO_x$ emissions from coal-fired power plants and for the manufacture of various ammonium-containing compounds.

While various embodiments of the present invention have been described in detail, it is apparent that modifications and adaptations of those embodiments will occur to those skilled in the art. However, it is to be expressly understood that such modifications and adaptations are within the spirit and scope of the present invention.

What is claimed is:

1. A method for the production of ammonia, comprising the steps of:
   (a) generating a reducing gas;
   (b) generating steam;

(c) contacting said reducing gas with a first metal oxide in a first reaction zone to reduce said first metal oxide to a first metal;

(d) contacting said steam with a molten metal pool including a second metal and contained in a second reaction zone to oxidize said molten second metal to a second metal oxide and form a first hydrogen gas stream;

(e) extracting said first hydrogen gas stream from said second reaction zone;

(f) contacting said reducing gas with said second metal oxide in said second reaction zone to reduce said second metal oxide to a second metal;

(g) contacting said steam with said first metal in said first reaction zone to oxidize said first metal to a first metal oxide and form a second hydrogen gas stream;

(h) extracting said second hydrogen gas stream from said first reaction zone; and (i) reacting at least one of said first and second hydrogen gas streams with nitrogen gas to form ammonia.

2. A method as recited in claim 1, wherein said reducing gas comprises CO.

3. A method as recited in claim 1, wherein said reducing gas consists essentially of CO.

4. A method as recited in claim 1, wherein said step of generating a reducing gas comprises reacting $CO_2$ with carbon to form CO.

5. A method as recited in claim 1, wherein at least one of said first and second metal oxides is iron oxide.

6. A method as recited in claim 1, wherein at least one of said first and second metal oxides is FeO.

7. A method as recited in claim 1, wherein at least one of said first and second metal oxides is tin oxide.

8. A method as recited in claim 1, wherein said steps of contacting with a reducing gas and contacting with steam occur at a temperature of from about 700° C. to about 900° C.

9. A method as recited in claim 1, wherein said method further comprises the step of monitoring the composition of at least one of said first and second reactors and switching the flow of said steam, reducing gas and hydrogen gas stream at a point in time determined by said composition.

10. A method as recited in claim 1, wherein said steps of extracting hydrogen gas comprise extracting water from said hydrogen gas stream.

11. A method as recited in claim 1, wherein said nitrogen gas is formed contacting air with a metal at a temperature sufficient to form a metal oxide and form a nitrogen gas stream.

12. A method as recited in claim 1, wherein said second metal comprises tin.

13. A method as recited in claim 1, wherein said second metal comprises iron.

14. A method as recited in claim 1, wherein said first metal oxide comprises tin oxide.

15. A method as recited in claim 1, wherein said first metal oxide comprises iron oxide.

16. A method for the production of ammonia, comprising the steps of:

(a) providing a reducing gas comprising CO;

(b) providing steam;

(c) contacting said reducing gas with particulates of a first metal oxide dispersed in a molten metal pool that includes at least a first molten metal within a first reactor that is adapted to contain said first molten metal, wherein said first metal oxide is reduced to said first metal;

(d) contacting said steam with a second molten metal pool including at least a second molten metal contained within a second reactor, wherein said second molten metal is oxidized to form second metal oxide particulates dispersed in said second molten metal pool and a first hydrogen gas stream is formed;

(e) extracting said first hydrogen gas stream from said second reactor;

(f) contacting said reducing gas with said second metal oxide particulates in said second reactor to reduce said second metal oxide particulates to a second metal;

(g) contacting said steam with said first metal in said first reactor to oxidize said first metal to a first metal oxide and form a second hydrogen gas stream;

(h) extracting said second hydrogen gas stream from said first reactor; and (i) reacting at least one of said first and second hydrogen gas streams with nitrogen gas to form ammonia.

17. A method as recited in claim 16, wherein said steps of contacting with a reducing gas and contacting with steam occur at a temperature of from about 700° C. to about 900° C.

18. A method as recited in claim 16, wherein said first and second molten metals comprise tin.

19. A method as recited in claim 16, wherein said first and second molten metals comprise iron.

* * * * *